United States Patent [19]

Grimsby

[11] 4,456,556

[45] Jun. 26, 1984

[54] OILSEED EXTRACTION PROCESS

[75] Inventor: Frank N. Grimsby, Houston, Tex.

[73] Assignee: Shell Oil Company, Houston, Tex.

[21] Appl. No.: 376,086

[22] Filed: May 7, 1982

[51] Int. Cl.$^3$ .......... C07F 5/02; C11B 1/00

[52] U.S. Cl. .......... 260/412.4

[58] Field of Search .......... 260/412.4

[56] References Cited

U.S. PATENT DOCUMENTS

| | | | |
|---|---|---|---|
| 2,469,147 | 5/1949 | Beckel et al. | 260/412.4 |
| 2,510,221 | 6/1950 | Harcourt | 260/412.4 |
| 2,571,143 | 10/1951 | Leslie | 260/412.4 |
| 3,993,535 | 11/1976 | Karnofsky | 260/412.4 X |
| 4,298,540 | 11/1981 | Youn et al. | 260/412.4 |

*Primary Examiner*—Helen M. S. Sneed

[57] ABSTRACT

A process for the extraction of oilseeds which comprises extracting oil from oilseeds by contacting the seeds with an isopropanol-based solvent to obtain an extract miscella of seedoils in solvent and a seed meal containing absorbed liquids, cooling and phase separating the miscella to recover solvent from the extracted oil, recycling said solvent from the miscella to the extraction step, heating the seed meal in a desolventizing-/toasting zone to produce a solvent vapor, contacting in a vapor/liquid contact zone the solvent vapor from the desolventizing toasting zone with a contact liquid which is a process solvent stream having a lesser content of water than the solvent vapor, withdrawing and condensing effluent vapor from the contact zone, passing at least a portion of the effluent vapor condensate to the extraction step as solvent, withdrawing effluent liquid from the contact zone and introducing said liquid into the desolventizing/toasting zone, and withdrawing a process meal product from the desolventizing/toasting zone. This process provides an energy efficient means for controlling water content in the process solvent, particularly in preventing the build-up of water in recycle streams to unacceptable levels.

4 Claims, 1 Drawing Figure

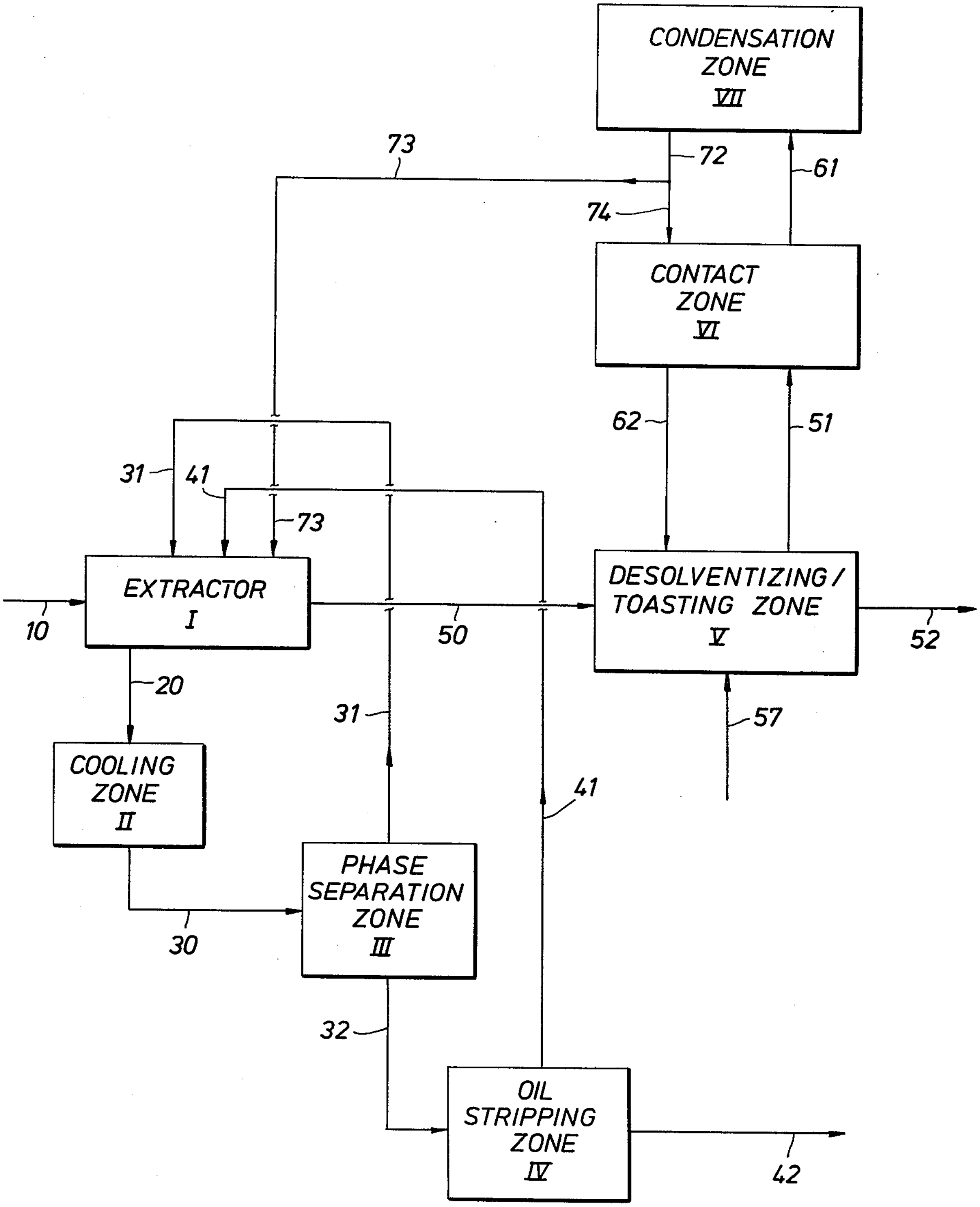
CONDENSATION ZONE VII
72
61
73
74
CONTACT ZONE VI
62
51
31
41
73
EXTRACTOR I
10
50
DESOLVENTIZING/ TOASTING ZONE V
52
20
31
57
COOLING ZONE II
41
PHASE SEPARATION ZONE III
30
32
OIL STRIPPING ZONE IV
42

OILSEED EXTRACTION PROCESS

BACKGROUND OF THE INVENTION

The present invention relates to an improvement in the processing of oilseeds, for example, soybean, cottonseed, corn, peanut, safflower, sunflower, and palm. More particularly, this invention relates to improvement in a process utilizing an isopropanol-based solvent to extract oil from such seeds.

The oilseed industry of the United States produces on an annual basis about thirteen million tons of seedoils from roughly one billion bushels of seed crops, predominantly soybean and cottonseed. Essentially all of this oil is recovered from the seeds by solvent extraction. The oils find primary use in foods, e.g., shortening, margarine, cooking oils, and salad oils, while seed meal from which the oil has been extracted, having a high protein content, is generally processed into animal feeds. About two percent of this meal is further refined for human consumption.

In the recovery of seed oils, the industry consumes large quantities of extraction solvent. Hexane has long been recognized as the standard solvent in the industry, due in part to its low cost relative to other solvents and in part to its physical and chemical properties. However, in recent years incentive has developed for the replacement of hexane as the solvent of choice for oilseed extraction. Increasing hexane costs and possibilities of supply shortages account for some of this incentive. In addition, for health and safety reasons, solvent specifications in the industry, precautions to prevent exposure of workers to hexane, and relevant hydrocarbon emission standards may be tightened. Furthermore, interest in producing an upgraded seed meal, for instance a meal suitable for human consumption without the need for secondary extraction or other refining, has given rise to attempts at use of alternate extraction solvents.

Of particular relevance to the present invention is the prior art relating to extraction of oilseeds with an isopropanol-based solvent. Characteristics of isopropanol extraction are generally well known and are described, for instance, by Harris et al in a three-part publication entitled "Isopropanol as a Solvent for Extraction of Cottonseed Oil" (J. Am. Oil Chem. Soc., November 1947, Vol. 24, pp. 370–375; December 1949, Vol. 26, pp. 719–723; and July 1950, Vol. 27, p. 273–275). More recent developments in oilseed processing with isopropanol are outlined by Youn and Wilpers in U.S. Pat. No. 4,298,540.

An important consideration in oilseed extraction with an isopropanol-based solvent is control over the water content of the solvent. Water, which enters the extraction process, for example, with the seed feedstock, in live steam employed either as a heat source or as an aid to one or more process separations, in solvent make-up, etc., often tends to build-up in the process, specifically in one or more process solvent recycle streams. It is well known (see, for instance, the publication of R. K. Rao and L. K. Arnold in J. Am. Oil Chem. Soc., August 1957, Vol. 34, pp. 401–404) that increasing the water content of an isopropanol-based extraction solvent diminishes the solubility of seedoils in the solvent at a given temperature and decreases the oil recovery efficiency of the overall extraction process. As a result, some method for controlling water content of solvent in the extraction process is necessary.

In the common conventional oilseed extraction process employing a hexane extractant, the relative insolubility of water in hexane permitted control of water in the process by simple phase separation. Because of the miscibility of isopropanol and water, phase separation cannot be applied in a like manner in the isopropanol solvent extraction process.

The principal approach which has been taken in the oilseed processing art to the control of water content in a process utilizing an isopropanol-based solvent involves restrictions upon the quantity of water introduced into the system, e.g., in the feedstock and in process steam flows. Water entering the system is limited to that which naturally exits the process in oil and meal products when the process is being practiced at a desired level of water content. This approach, however, is difficult to implement and control. It would be possible to reduce process water content by distillation of a liquid solvent stream, for instance, in a manner such as that described in U.S. Pat. No. 4,298,540. This, however, entails a substantial and costly addition to process energy and equipment requirements.

SUMMARY OF THE INVENTION

The present invention provides an improvement in processes for the solvent extraction of oil from oil-containing seed crops, which relates to a simplified energy efficient means of control over the water content in the extraction process. The invention is applicable to processes which comprise steps for (a) contacting, in an extractor, oilseeds with an isopropanol-based extraction solvent to obtain an extract miscella of seedoil in solvent and a seed meal containing absorbed solvent, (b) cooling and phase separating the miscella to recover solvent from the extracted oil, (c) recycling said solvent recovered from the miscella to the extractor, (d) heating the seed meal in a desolventizing/toasting zone to obtain a solvent vapor, (e) condensing solvent vapor from the desolventizing/toasting zone in a condensing zone, and (f) recycling solvent condensate to the extractor. The improvement to such processes comprises additional steps for contacting in a vapor/liquid contact zone solvent vapor evaporated from the seed meal, prior to condensation, with a contact liquid which is an isopropanol-based process solvent stream having a water content less than the water content of the solvent vapor, withdrawing vapor from the contact zone and introducing said vapor to the condensing zone as the solvent vapor, and withdrawing liquid from the contact zone and introducing said liquid to the desolventizing/toasting zone. Preferably, a portion of the condensate, obtained by condensing vapor withdrawn from the contact zone, is employed as the contact liquid. In processes in which an extracted oil phase is withdrawn from the phase separation step and then subjected to a steam stripping step for the evaporation of residual solvent therein, the invention optionally includes contacting both this vapor evaporated from the phase-separated oil and the vapor evaporated from the seed meal with the contact liquid in the contact zone.

DESCRIPTION OF THE DRAWING

The invention is further illustrated by the attached drawing, which depicts in a single FIGURE a simplified schematic flow diagram of a particular embodiment. It is to be understood that the drawing omits a detailed showing of equipment, instrumentation, piping, valving, etc., which would be used in practicing the process, as such matters will be apparent to those skilled in the relevant processing arts. It should also be understood that while the embodiment of the invention shown in the drawing is characterized by. continuous process operation, the invention can similarly be operated in a batch mode.

Referring to the drawing, the invention is shown in the context of a conventional process scheme for extraction of a seed feedstock 10 with isopropanol-based solvent 31, 41, and 73 in an extractor I to produce a liquid miscella extract 20 and an extracted meal 50, cooling of the miscella in zone II, phase separation of cooled miscella 30 in zone III to obtain solvent-rich stream 31 and oil-rich stream 32, stripping of the oil-rich stream in zone IV to recover solvent 41, desolventizing-/toasting of extracted meal 50 in zone V to recover solvent vapor which can be condensed and recycled to the extractor. Process oil product is taken from zone IV as stream 42 and process meal product from zone V as stream 52.

The improvement of the invention centers upon the vapor-liquid contact zone VI. In the embodiment shown, vapors from the desolventizing/ toasting zone V, having a high water content resulting in part from introduction of live steam 57, is intimately contacted with a contact liquid 74 having a lesser content of water. This contact results in a reduced water content of the vapor 61 exiting the contact zone which is beneficial for water control in the overall process when this stream is condensed in zone VII and recycled to the extractor as solvent. In this particular embodiment, contact liquid stream 74 and a recycle solvent stream 73 are divided from condensate 72. Contact zone effluent liquid 62 is routed to the desolventizing/toasting zone.

DESCRIPTION OF THE PREFERRED EMBODIMENTS

The invention is practiced in the context of an oilseed extraction process utilizing an isopropanol-based solvent. Necessarily included in such a process for present purposes are steps for extractive contact between the solvent and the oilseeds to produce a liquid miscella extract and a "wet" meal containing adsorbed process liquids and for cooling and phase-separating the miscella into a recovered solvent stream and an oil-rich stream. Such steps are suitably practiced according to methods well known in the art. (The teachings of the above-cited Harris et al publications, of U.S. Pat. No. 4,298,540 and of the commonly assigned, copending application of F. N. Grimsby, Ser. No. 376,085, filed on even date herewith, on techniques for isopropanol solvent extraction of oilseed extraction are incorporated herein by reference.) The invention is also necessarily conducted in the context of a step for desolventizing and toasting the wet meal. Apart from provisions relating to the routing of process streams to and from the contact zone for purposes of this invention, the desolventizing/toasting step may also suitably be practiced according to methods known to the art. (See, for instance, E. Sipos et al, J. Am. Oil Chem. Soc., March 1961, Vol. 38, pp. 15–19, and R. D. Good, Oil Mill Gazetteer, November 1973, pp. 23–27, the teachings of which on this subject are incorporated by reference.) Typically, but by no means necessarily, the desolventizing/toasting step is carried out using a vertical cylindrical vessel. Meal containing absorbed isopropanol and water is introduced at the top of the vessel. As it passes down through the vessel it is heated with isopropanol and water vapor. Live steam is optionally introduced for heating. Solvent vapor is withdrawn from the top of the vessel and an essentially isopropanol-free meal is withdrawn from the bottom. Under conventional practice, solvent vapor resulting from this step is condensed and condensate recycled to the extractor. For purposes of the invention, this vapor is instead introduced into the specified vapor/liquid contact zone. Also for purposes of the invention, a liquid effluent stream is withdrawn from the contact zone and routed to the desolventizing/toasting zone. This liquid contact effluent stream is preferably introduced into one or more stages of the desolventizing/toasting zone as a liquid, for instance, through one or more sets of spray distributing nozzles.

The invention centers upon a vapor/liquid contact step in which the solvent vapor withdrawn from the desolventizing/toasting step is contacted with a liquid solvent stream having a lesser content of water than does the said solvent vapor. This contact step may conveniently be carried out in any manner which provides intimate contact between the vapor and liquid flows. Such contact can suitably be accomplished, for example, in trayed or packed veritical column sections as are commonly employed in distillation, absorption, and similar liquid-gas contact systems. Criteria developed for the application of liquid-gas contact technology in these conventional applications may be likewise employed in the practice of the contact step of the invention. In other words, care should be taken in the design of the contact zone to avoid flooding, priming, excessive entrainment, etc. Consideration should also be given to the possibility of the presence of solid fines from the seed meal which are often carried along with the solvent vapor withdrawn from the desolventizing-/toasting step and may tend to plug contact equipment. Such fines may optionally be removed from the vapor before it enters the contact zone. However, it is a feature of the invention that a scrubber, cyclone separator or the like typically applied to the removal of solid fines from vapor streams may itself serve as a contact zone for purposes of the invention, if a suitable contact liquid stream is introduced into contact with the vapor in the scrubber or other separations device. Countercurrent flow of the contact liquid stream and the solvent vapor over sieve or grid or disc and doughnut trays or packing in a vertical column may generally be expected to give particularly good vapor/liquid contact results for purposes of the invention. It will usually be desirable to employ between about one and 10 theoretical contact stages, or about 2 to 20 actual stages, more preferably about 3 to 12 actual trays or their functional equivalent in packing, although minimal contact in a single stage or tray will afford some degree of benefit.

The choice of the process stream utilized as contact liquid for purposes of the invention is not critical. As examples of suitable sources of contact liquid in the process, mention may be made solvent condensed from vapors stripped from phase-separated oil and solvent make-up. However, particular preference may be stated for a contact liquid stream which has been condensed from the contact zone effluent vapor.

As a general rule, the quantity of contact liquid introduced into the contact zone is suitably between about 5 and 75 percent by weight (%w) calculated on the quantity of vapor entering the zone. A quantity of contact liquid between about 7 and 40% w calculated on contact vapor is preferred, while a quantity between about 8 and 20% w is considered most preferred. From the standpoint of process energy efficiency, no more contact liquid should be used than is necessary to accomplish the desired degree of control over water content in the recycle solvent. An increase in the flow of contact liquid into the contact zone results in an increase in the liquid effluent flow from the contact zone to the desolventizing/toasting zone, and in turn, in an increase in energy required to operate the desolventizing/toasting zone.

The invention may, of course, be suitably applied in the context of other process steps in addition to the conventional extraction, cooling, phase separation, and desolventizing/toasting steps indicated. Of particular interest is an optional step for stripping residual solvent from the oil-rich phase of the phase-separation step. In this stripping step, the oil-rich phase is heated to evaporate the residual solvent. Solvent vapors are recovered and condensed and the condensate recycled to the extractor. If, as is often the case, live steam is introduced into the stripping operation as a heat source and as an aid to the desired solvent separation, there may be advantage in routing the vapor produced in the stripping step to the contact zone, either directly, in combination with the vapor withdrawn from the desolventizing-/toasting step, or indirectly, by introducing the stripping step vapor into one or more stages of the desolventizer/toaster. If, on the other hand, live steam has not been introduced into the stripping step, the vapor therefrom is typically of low water content, e.g., 5 to 10% w, and thus suitable for use as the liquid stream introduced into the contact zone for purposes of the invention. (For example, with reference to the drawing, stripping step vapor 41 from zone IV is suitably condensed and introduced to contact zone VI as all or part of stream 74. Alternatively, the stripped vapor from zone IV may be combined with contact zone vapor effluent 61, and condensed in zone VII, and included in streams 72, 73 and 74.)

For further illustration, one particular process embodiment in accordance with the invention is described in the following example.

EXAMPLE

Again referring to the drawing for description of a representative continuous process embodiment of the invention, flaked soybeans are introduced as feed to a multi-stage countercurrent extractor I via line 10. Contact of the soybeans with isopropanol-based solvent in the extractor yields wet meal which is withdrawn as stream 50 and miscella which is withdrawn as stream 20. Miscella is cooled (zone II) and phase separated (zone III) to produce a solvent-rich phase which is recycled to the extractor in line 31 and an oil-rich phase, which is passed via line 32 to the oil stripping zone IV. Seedoil product is taken from zone IV of the process in stream 42. Solvent vapor recovered from the oil is condensed in zone IV and recycled to the extractor in line 41.

In particular illustration of the process improvement of the invention, wet meal stream 50, which contains about 175 pounds per hour of non-volatiles (principally meal protein and residual oil), about 84 pounds per hour of isopropanol, and about 41 pounds per hour of water, is introduced into a typical desolventizing/toasting zone V. In the embodiment of the invention now described, no stream is introduced into zone V via the line 57.

The heating of wet meal 50 under common conventional desolventizing/toasting procedures results in a vapor stream containing about 84 pounds per hour of isopropanol and about 25 pounds per hour of water. Vapor stream 51 contains what would usually be considered an excessive quantity of water relative to isopropanol. Such an excess proportion of water in this stream is characteristic of applications of common desolventizing/toasting techniques to oilseed meals wet with isopropanol-based solvents, and provides incentive for practice of the invention.

If stream 51 were condensed and directly recycled to the extractor, as under conventional practice and without use of the contact zone in accordance with the invention, water content of the process solvent streams would build-up to an undesirably high level.

Under the invention vapor stream 51, is introduced into zone VI for contact with a contact liquid stream 74. Countercurrent contact of vapor 51 with contact liquid 74 over about 2 theoretical contact stages results in a contact zone effluent vapor 61 and an effluent liquid stream 62. Stream 61 is condensed by cooling in zone VII to produce a liquid stream 72. Stream 72 is divided into two process flows: a solvent stream 73 that is recycled to the extractor and the contact liquid stream 74. Both vapor stream 61 and condensed liquid stream 72 contain about 93.3 pounds per hour of isopropanol and about 17.8 pounds per hour of water. About ninety percent of stream 72 is recycled to the extractor while about ten percent is routed to zone VI as the contact liquid. Thus, stream 73 contains about 84 pounds per hour of isopropanol and about 16 pounds per hour of water, and stream 74 contains about 9.3 pounds per hour isopropanol and about 1.8 pounds per hour of water. Effluent liquid from the contact zone stream 62 is introduced into the desolventizing/toasting zone.

The water content of the resulting solvent stream 73 under this embodiment of the invention, i.e., about 16 parts by weight water to 84 parts by weight isopropanol, is sufficiently low to permit direct recycle to the extractor and still maintain control over water content in the overall process at a generally acceptable level. Through the conduct of the invention, water which would otherwise have remained in the extraction system, leaves the process, via meal stream 52. Stream 52 totals 200 pounds per hour of which 25 pounds per hour is water.

I claim as my invention:

1. In a process for the solvent extraction of oil from oil-containing seeds, comprising steps for (a) contacting in an extractor the oilseeds with an isopropanol-based extraction solvent to obtain an extract miscella of seedoil in solvent and a seed meal containing adsorbed solvent, (b) cooling and phase separating the miscella to recover solvent from the extracted oil, (c) recycling said solvent recovered from the miscella to the extractor; (d) heating the seed meal in a desolventizing/toasting zone to obtain a solvent vapor, (e) condensing the solvent vapor, and (f) recycling solvent vapor condensate to the extractor, the improvement which comprises additional steps for contacting in a vapor/liquid contact zone the solvent vapor evaporated from the seed meal, before condensation, with a contact liquid which is an isopropanol-based process solvent stream having a water content less than the water content of the solvent vapor, withdrawing vapor from the contact zone and introducing said vapor to the condensation zone as solvent vapor, and withdrawing liquid from the contact zone and introducing said liquid to the desolventizing-/toasting zone.

2. The process of claim 1, wherein a portion of the condensed solvent vapor is introduced as contact liquid into the contact zone.

3. The process of either claim 1 or claim 2, wherein the quantity of contact liquid is between about 5 and 75 percent by weight, calculated on the quantity of solvent vapor with which it is contacted in the contact zone.

4. The process of claim 3, wherein the process includes a step for stripping a solvent vapor from the phase separated miscella oil, and the improvement additionally comprises contacting both this stripped solvent vapor and the solvent vapor evaporated from seed meal with the contact liquid in the contact zone.

* * * * *